United States Patent

Kaiser et al.

[11] Patent Number: 6,060,996
[45] Date of Patent: *May 9, 2000

[54] PAGER BROADCAST SYSTEM

[75] Inventors: Gordon E. Kaiser, Balboa Island; Steven J. Davis, Hermosa Beach, both of Calif.

[73] Assignee: Cue Network Corporation, Irvine, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/931,450

[22] Filed: Sep. 17, 1997

Related U.S. Application Data

[60] Provisional application No. 60/037,828, Feb. 5, 1997.

[51] Int. Cl.[7] ........................................ G08B 5/22
[52] U.S. Cl. ........................................ 340/825.44
[58] Field of Search .................. 455/38.4, 38.2, 455/38.1, 62.1, 12.1, 13.2, 552, 126, 127, 575; 370/373, 314, 329, 343; 340/825.44, 825.47, 825.48, 825.49, 825.52; 342/357.07, 386, 457

[56] References Cited

U.S. PATENT DOCUMENTS

| | | | |
|---|---|---|---|
| 5,206,855 | 4/1993 | Schwendeman et al. | 340/825.44 |
| 5,404,569 | 4/1995 | Schwendeman et al. | 340/825.44 |
| 5,440,298 | 8/1995 | Kuramatsu | 340/825.44 |
| 5,535,430 | 7/1996 | Aoki et al. | 455/552 |
| 5,757,782 | 5/1998 | Gaskill | 370/313 |

*Primary Examiner*—Howard L. Williams
*Assistant Examiner*—Jean B. Jeanglaude
*Attorney, Agent, or Firm*—Townsend and Townsend and Crew LLP

[57] ABSTRACT

Paging network distributes a paging messages through a satellite uplink and a low power satellite transceiver which receives a satellite signal and rebroadcasts it at low power to nearby pages. The pagers are adapted to detect the low power retransmissions and to switch to FM broadcast band transmissions if the low power transmission is not detected.

11 Claims, 8 Drawing Sheets

PAGER BROADCAST SYSTEM

CROSS REFERENCE TO RELATED APPLICATIONS

This application claims priority of U.S. Provisional Application Ser. No. 60/037,828 filed Feb. 5, 1997, which is incorporated herein by reference for all purposes.

BACKGROUND OF THE INVENTION

The present invention relates to paging networks. In particular, one embodiment of the present invention provides an improved paging network which uses satellites to fill gaps in FM station coverage.

Paging networks generally operate by broadcasting small packets of data which are addressed to specific pagers. A pager listens to the broadcasts and responds to those packets addressed to that pager.

One way to broadcast messages is to use subcarriers of existing radio stations. This avoids the need for the operator of a paging network to purchase and maintain separate broadcast equipment. A standard FM radio station broadcasts up to five subchannels on subcarriers of 0 Khz, 19 Khz, 38 Khz, 57 Khz and 68 Khz. The first two subcarriers are used for mono and stereo transmission, respectively, of the radio station broadcast picked up by ordinary radio receivers. The other three subcarriers are known as SCA (Secondary Channel Authority) subcarriers, and can be used to carry audio or data transmissions for receipt by specially configured receivers. Where a paging network broadcasts using the SCA subcarriers of the radio station, the pagers are configured to listen to a particular subcarrier band and decode data thereon, looking for messages with that pager's address. Many thousands of such pagers are in use today and therefore can be made inexpensively. Another simplification in the pager market has been the standardization of protocols, so that most pagers made today for SCA use have been standardized.

Because it is difficult to cover a large geographic region, such as the North America continent, with continuous radio coverage, a paging network might have gaps in coverage. If a pager is in an uncovered area, it will not receive messages sent to it. Since pagers are generally receive-only, the paging network does not have a way to ensure that the pager received a message, therefore it is incumbent on the paging network to make efforts to ensure coverage.

Of course, pagers would be more likely to receive signals if they have better antennae, higher power, etc. Unfortunately, longer range pagers are often unsuitable for applications where the user of the pager wants a compact, light device to carry around.

Therefore, what is needed is a system for increasing pager reception without adding to the bulk of a pager. Preferably, the increase must be done without modifying the design of the basic, standardized pager.

SUMMARY OF THE INVENTION

An improved paging network is provided by virtue of the present invention. In one embodiment, a page service sends pages to a satellite, which broadcasts them to satellite transceivers, some of which are mounted in vehicles. The satellite transceivers retransmit the pages over a low-power FM carrier to nearby pagers A further understanding of the nature and advantages of the inventions herein may be realized by reference to the remaining portions of the specification and the attached drawings.

DESCRIPTION OF THE PREFERRED EMBODIMENT

In the preferred embodiment, a paging network subscriber is provided with a pager. A mobile paging transceiver is provided either to the subscriber or a group of subscribers likely to be located near the mobile paging transceiver when a page is received. A typical transceiver is adapted to be mounted in a vehicle and the pagers of subscribers who use the vehicle are associated with that particular transceiver. The pager listens for a low-power signal from the transceiver. If the pager is out of range and cannot pick up the signal, it listens for a paging signal on an FM broadcast channel. Since the transceiver broadcasts as low power, it broadcasts just outside the FM broadcast band to avoid being swamped by a broadcasting FM station. Because the transceiver frequency is just outside the FM broadcast band, conventional FM circuitry can be used, albeit with a local oscillator capable of tuning just beyond the FM broadcast band.

In a specific embodiment, the transceiver transmits on 87.5 MHz to avoid FM broadcasts in the 88–108 MHz band. If the pager is out of range of the transceiver, it scans the FM broadcast band to find a station signal having a subscarrier broadcasting pages using the SWIFT protocol. If a SWIFT protocol subcarrier is not found, the pager scans for an MBS protocol subcarrier. Periodically, the pager will look for the 87.5 MHz carrier or the SWIFT subcarrier. In North America, and possibly other geographic areas, SWIFT refers to an 8000 bps data channel modulated on the 76 kHz subcarrier of a cooperating radio station's signal, which MBS refers to an 1187.5 bps data channel modulated on the 57 kHz subcarrier of a cooperating radio station's signal.

Figure 1:
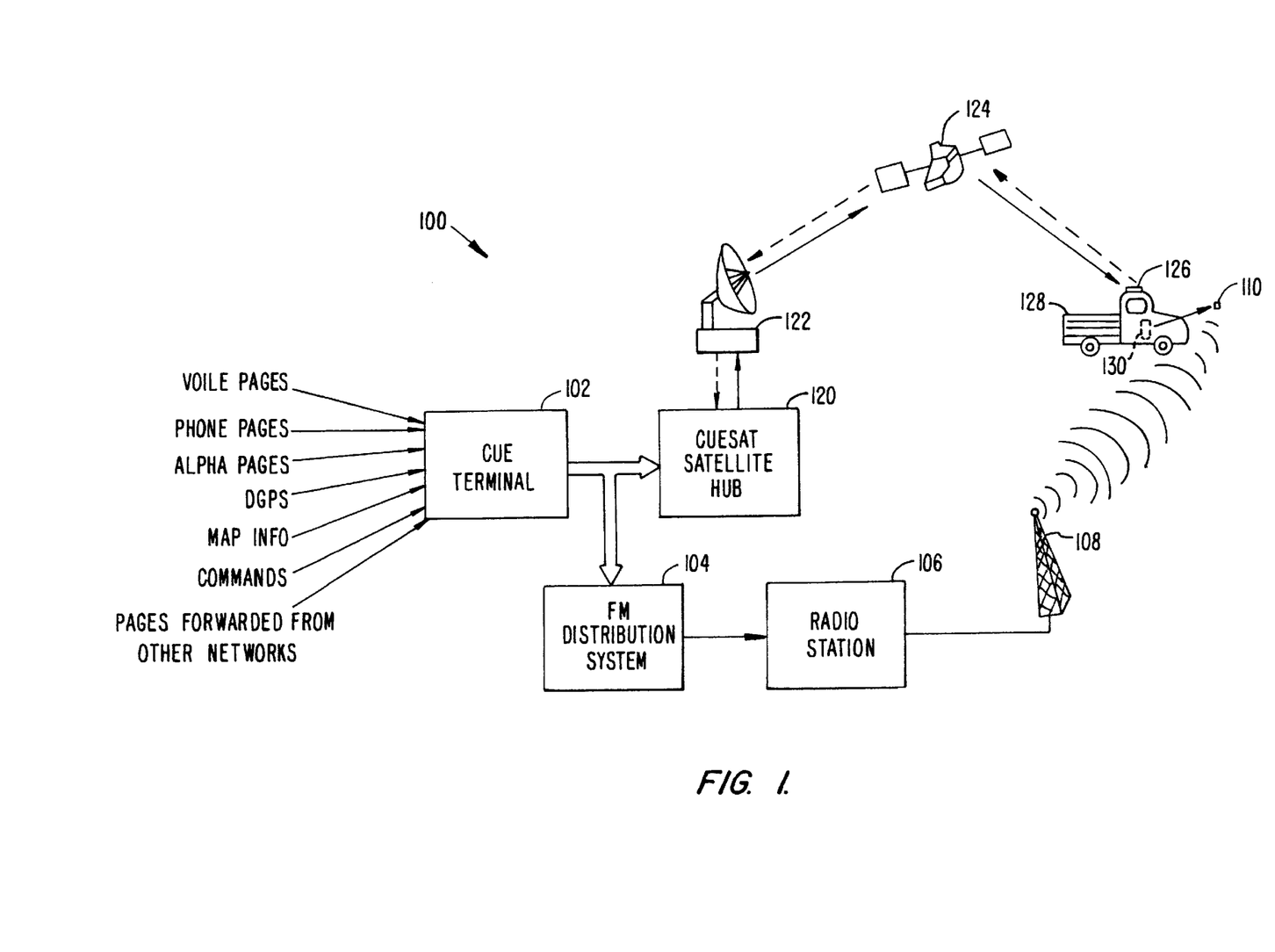
FIG. 1 is a block diagram of a paging network according to the present invention.

Referring now to FIG. 1, a block diagram of an overall paging system 100 is there shown. For simplicity, the details of conventional FM signal distribution are omitted and only one FM radio station, one transceiver and one pager are shown. In practice, however, several FM radio stations would be broadcasting pages (or other conventional non-FM broadcast methods might be used) and many transceivers and pagers would be in use.

Paging system 100 is shown comprising a terminal 102, coupled to an FM distribution system 104, which is in turn coupled to an FM radio station transmitter 106 coupled to an FM broadcast antenna 108. Terminal 102 is also shown coupled to a satellite hub 120, which is in turn coupled to an uplink antenna 122 which communicates with a satellite 124. Satellite 124 broadcasts to many transceivers, including transceiver 130 which receives signals from satellite 124 using wideband antenna 126. Transceiver 126 shown in FIG. 1 is mounted in a vehicle 128 and includes a low-power FM transmitter for sending pages to a pager 110.

The operation of paging system 100 will now be described. Terminal 102 receives all manner of pages, such as numeric-only pages, alphanumeric pages, voice pages (typically compressed to fit in the limited bandwidth of a paging system), digital Global Positioning System (DGPS) information, map/navigating information, pager commands and pages forwarded from other systems, such as a call-in paging system, an e-mail forwarder, etc. Terminal 102 formats these pages appropriately, including an address of the pager or (group of pagers) to which the page is directed, and terminal 102 sends the pages to satellite hub 120 as well as FM distribution system 104.

The broadcast of pages over the FM broadcast band can be done in a conventional manner, which might involve transmitting the pages, along with the radio station's public signal, from a studio to a satellite for distribution, or other methods known in the art. Such conventional FM rebroadcast satellites should not be confused with satellite 124.

Satellite hub 120 sends the collected pages to satellite 124 via uplink antenna 122 and satellite 124 broadcasts on a paging channel to all of the transceivers 130 in the satellite range (which might be regional or continental). Transceiver 130 receives the signals from satellite 124 using wideband antenna 126 and retransmits the signals, after conversion, in a local area which includes the interior of vehicle 128 and the area outside vehicle 128, but not so far as to require complex licensing and regulation from applicable radio transmission control agencies.

Pager 110 receives pages from transceiver 130 when pager 110 is in range. When out-of-range, pager 110 picks up pages from the FM broadcast network via FM broadcast antenna 108. Preferably, pager 110 will use the signal from transceiver 130, for several reasons. For specially-equipped pagers, the channel between the transceiver and the pager is bidirectional. Since transceivers are intended to be close range devices, this could be implemented without undesirably increasing the size, weight or cost of the pagers. Furthermore, as transceiver 130 is bidirectional in that it can transmit back to satellite 124, pager 110 can be equipped with emergency call capability. In a simpler embodiment, emergency messages are sent from transceiver 130 only. These emergency messages are transmitted back to terminal 102 or other terminus selected by the paging network operator, where the messages are acted upon. Since emergency messages will tend to be short and infrequent, sufficient bandwidth for all emergency broadcasts should be easy to accommodate.

Figure 2:
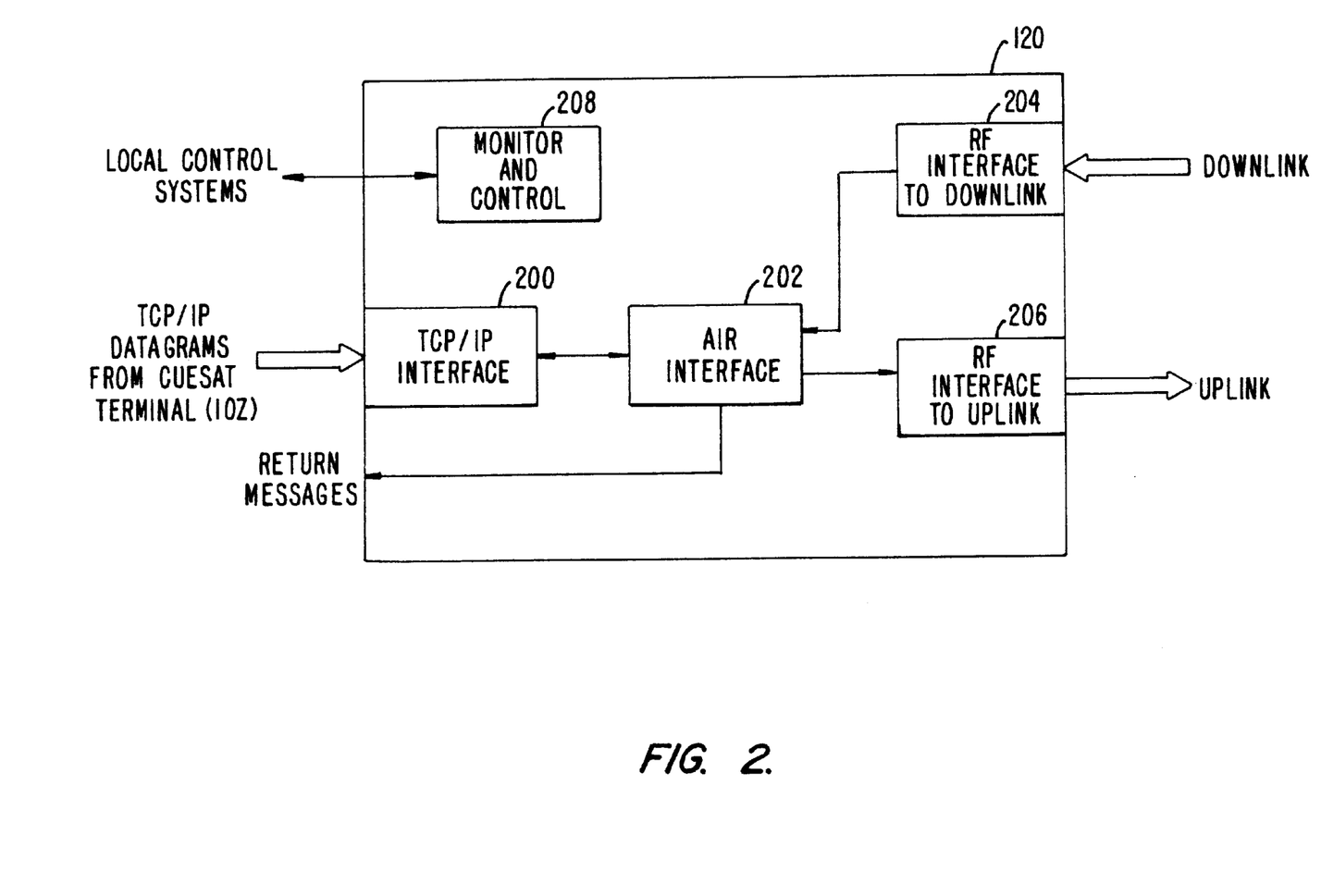
FIG. 2 is a block diagram showing the satellite hub of FIG. 1 in greater detail.

Referring now to FIG. 2, details of satellite hub 120 are there shown. Satellite hub 120 is shown comprising a TCP/IP interface 200, an air interface 202, an RS interface 204 to a satellite downlink and an RS interface 206 to a satellite uplink, as well as monitor and control circuits 208 for controlling various aspects of satellite hub 120.

In operation, satellite hub 120 receives TCP/IP datagrams from terminal 102, although it should be understood that other configurations of data transport can be used in place of TCP/IP. TCP/IP interface 200 converts the received datagrams into a protocol expected to buy air interface 202. Air interface 202 provides outgoing data to RF interface 206, which is transmitted to satellite 124 the uplink antenna 122 (see FIG. 1). Downlink data, such as satellite 124 control data and emergency messages received from transceivers 130 (see FIG. 1). RF interface 204 provides this downlink data to air interface 202, which provides the return messages to the paging network's terminus for such messages. In this manner, paging network 100 effectively broadcasts paging data to each of the transceivers in satellite transmission range, such as transceiver 130.

Figure 3:
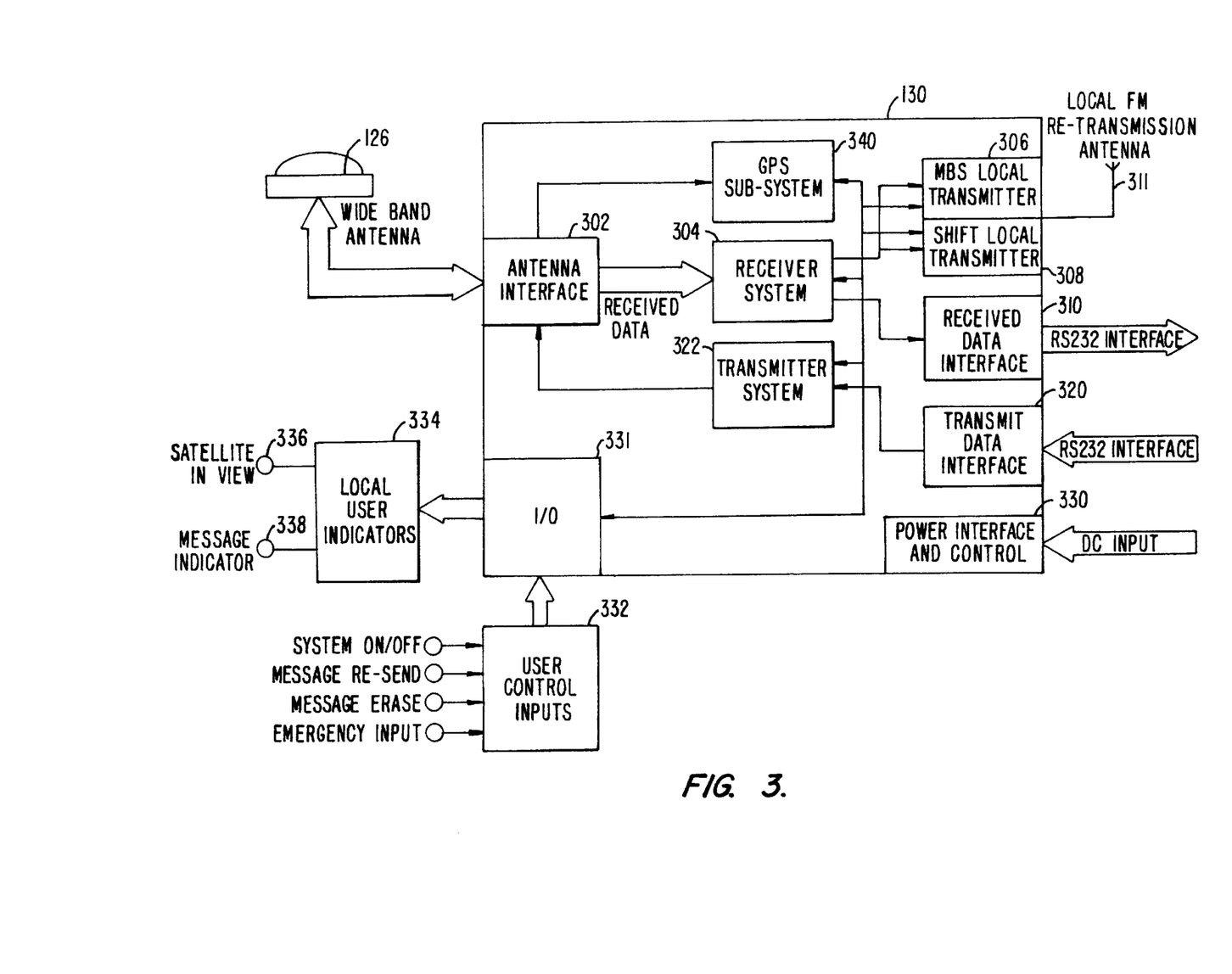
FIG. 3 is a block diagram showing the mobile transceiver of FIG. 1 in greater detail.

Referring now to FIG. 3, details of transceiver 130 are there shown. It should be understood that transceiver 130 could be replaced with a receiver of similar design if the capability of transmitting control and emergency messages back to satellite 124 is not provided to all subscribers.

Transceiver 130 is shown comprising an antenna interface 302 coupled to a wideband antenna 126, which together receive the satellite signal and convert it to a datastream. A receiver system 304 is coupled to receive the datastream which is separated into data and pages. Receiver system 304 is coupled to a MBS local transmitter 306 and a SWIFT local transmitter 308, as well as providing the datastream to a received data interface 310. MBS local transmitter 306 and SWIFT local transmitter 308 are coupled to an antenna 311 which provides for local FM retransmission of pages.

Transceiver 130 also includes a transmit data interface 320 coupled to a transmitter system 322 which is in turn coupled to antenna interface 302. Power interface and control circuitry 330 is provided to control and power the various elements of transceiver 130. I/O logic 331 is provided for user interface. Transceiver 130 provides for user control inputs 332 and local user indicators 334, which include an indicator light 336 indicating when satellite 124 is in view and indicator 338 which indicates that a message has been sent to a pager associated with transceiver 130.

In operation, wideband antenna 126 receives the satellite signal and antenna interface 302 decodes it. Receiver system 304 separates the received and decoded data into pages and data. The data is provided to received data interface 310 which outputs it via an RS232 interface. This can be used for portable computers or communication with any other devices having an RS 232 interface. The pages are provided to MBS local transmitter 306 and/or SWIFT local transmitter 308 or transmission to pager 110 (not shown). Only one of transmitters 306, 307 need to be used for any given page. Considerations to be used in selecting among the two transmitters include the band width required for the pages (as mentioned above, the swift protocol allows for a higher data rate) and whether or not receiver system 304 prefilters the pages. In one embodiment, receiver system 304 is informed of the addresses of pagers associated with transceiver 130 and receiver system 304 transmits only those pages directed to one or more pagers associated with transceiver 130. Given this selectivity, the band width available in either of transmitters 306, 308 may well be sufficient for all the pages directed to pagers associated with transceiver 130.

User control inputs 332 allow a user to power on/power off transceiver 130, request that a message be resent, that a message be erased, or that an emergency message be transmitted. The message erase capability is useful to turn off message indicator 338 once all the messages have been reviewed. If the emergency input is activated an emergency message input via transmit data interface 320 and transmitter system 322 is provided to antenna interface 302 and transmitted through wide band antenna 126 to satellite 124 (not shown) as described above.

A GPS subsystem is coupled to antennae interface 302 to receive Global Positioning System data for use in navigation.

Figure 4:
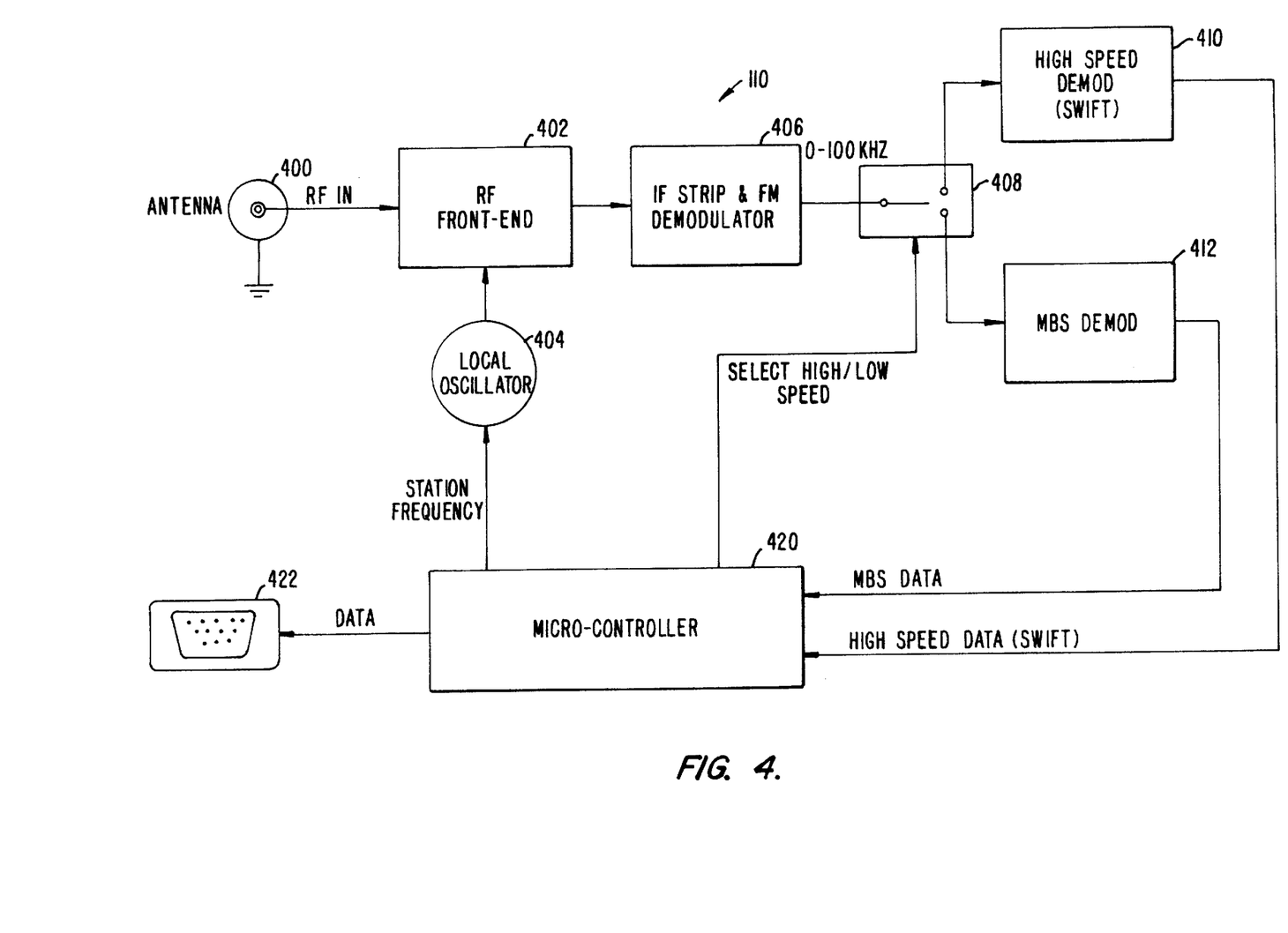
FIG. 4 is a block diagram showing the pager of FIG. 1 in greater detail.

Referring now to FIG. 4, a block diagram of pager 110 is there shown. As should be apparent, not all elements of pager 110 are shown. For example, there is power supply, display, vibrator circuits and the like are not shown for simplicity. Pager 110 receives pages on antenna 400. An RF line from antenna 400 is provided to RF front and 402 which reduces the RF signal to an intermediate system (IF) signal based on the carrier frequency provided by a local oscillator 404. The IF signal is provided as an input to an IF demodulator 406, which outputs a base band 100 kHz. That signal is coupled to a switch 408 which either routes the base band signal to a SWIFT demodulator 410 for an MBS demodulator 412. The output of these two demodulators are provided to a microcontroller 420, which controls switch 408, as well as setting the station frequency for local oscillator 404 and providing data at an output 422.

In operation, microcontroller 420 sets local oscillator 404 to the carrier frequency of the low power FM retransmission from transceiver 130 (not shown). In a specific embodiment this local retransmission frequency is 87.5 MHz, which is just outside the FM broadcast band of 88 to 108 MHz. Microcontroller 420 then controls switch 408 to find data at the output of either the SWIFT demodulator for 10 or the MBS demodulator for 12. As explained above, the SWIFT protocol uses the 78 kHz subcarrier, while the MBS protocol use the 57 kHz subcarrier. Therefore, SWIFT demodulator 410 is preferably a 76 kHz demodulator and MBS demodulator 412 is a 57 kHz demodulator. If microcontroller 420 does not find either MBS data or high speed SWIFT data at 87.5 MHz, it switches to a scan mode where microcontroller 420 scans the conventional FM broadcast band looking for an FM broadcast having either a SWIFT protocol subcarrier thereon or an MBS protocol subcarrier thereon. In this manner, pager 110 receives pages using one of several different channels, depending on which channel is available. As explained above, the transceiver channel is generally available if pager 110 is in or near vehicle 128.

Figure 5:
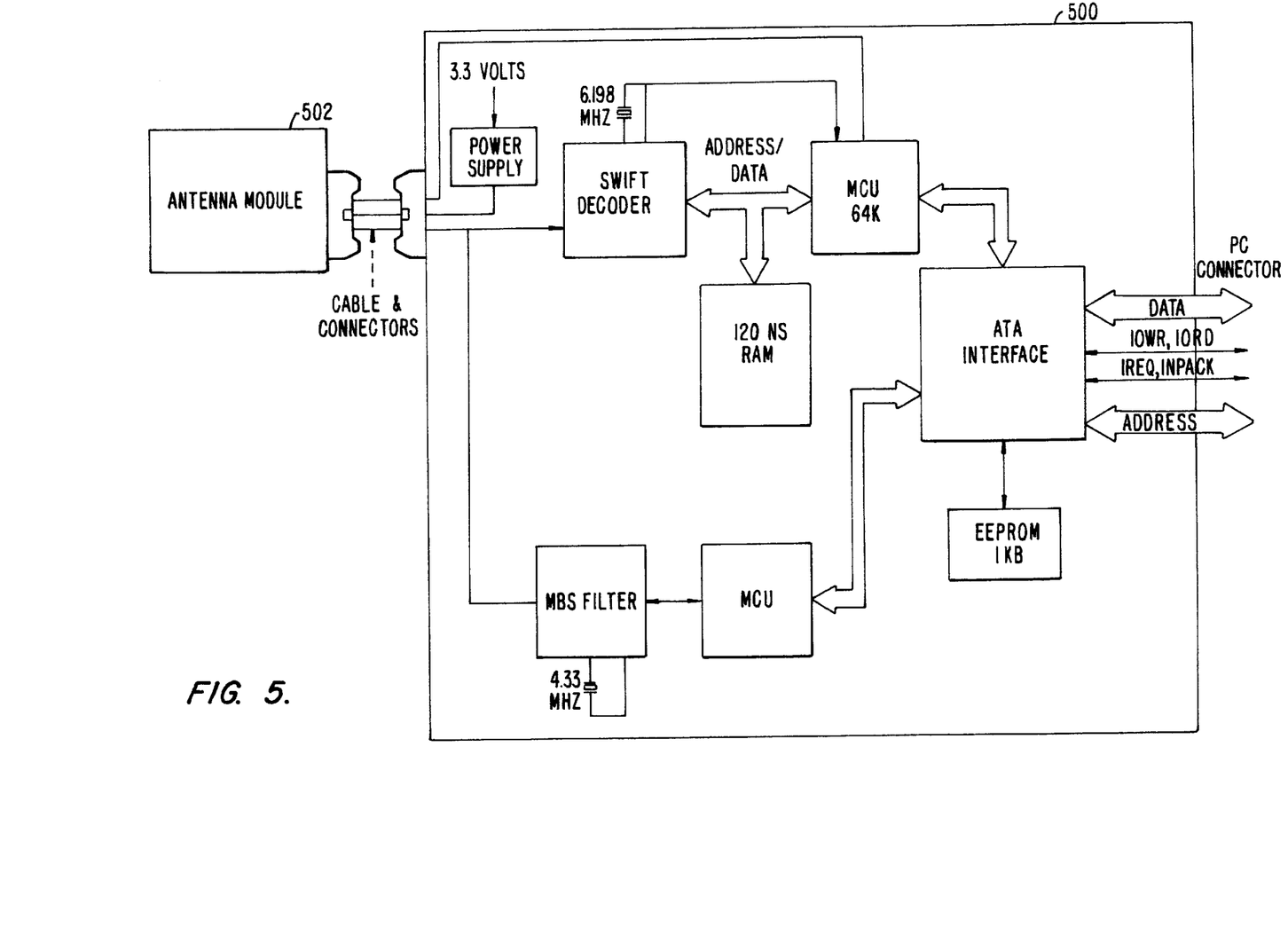
FIG. 5 is a block diagram of a pager card as might be used in a personal computer to receive pages.

Referring now to FIG. 5, an alternate embodiment of a pager is there shown. Pager 500 shown there is in the form of a card adapted to be plugged into a personal computer, laptop computer or the like. In cases where the case of the computer blocks radio reception, an external antenna module 502 is used and coupled to pager card 500 via a cable. As there shown, pager card 500 details both SWIFT protocol and MBS protocol subcarriers, depending on which is available and it makes the pages available to a computer interface. In a preferred embodiment, the radio frequency demodulation is performed with an antenna module 502, but can also be done on pager card 500.

Figure 6:
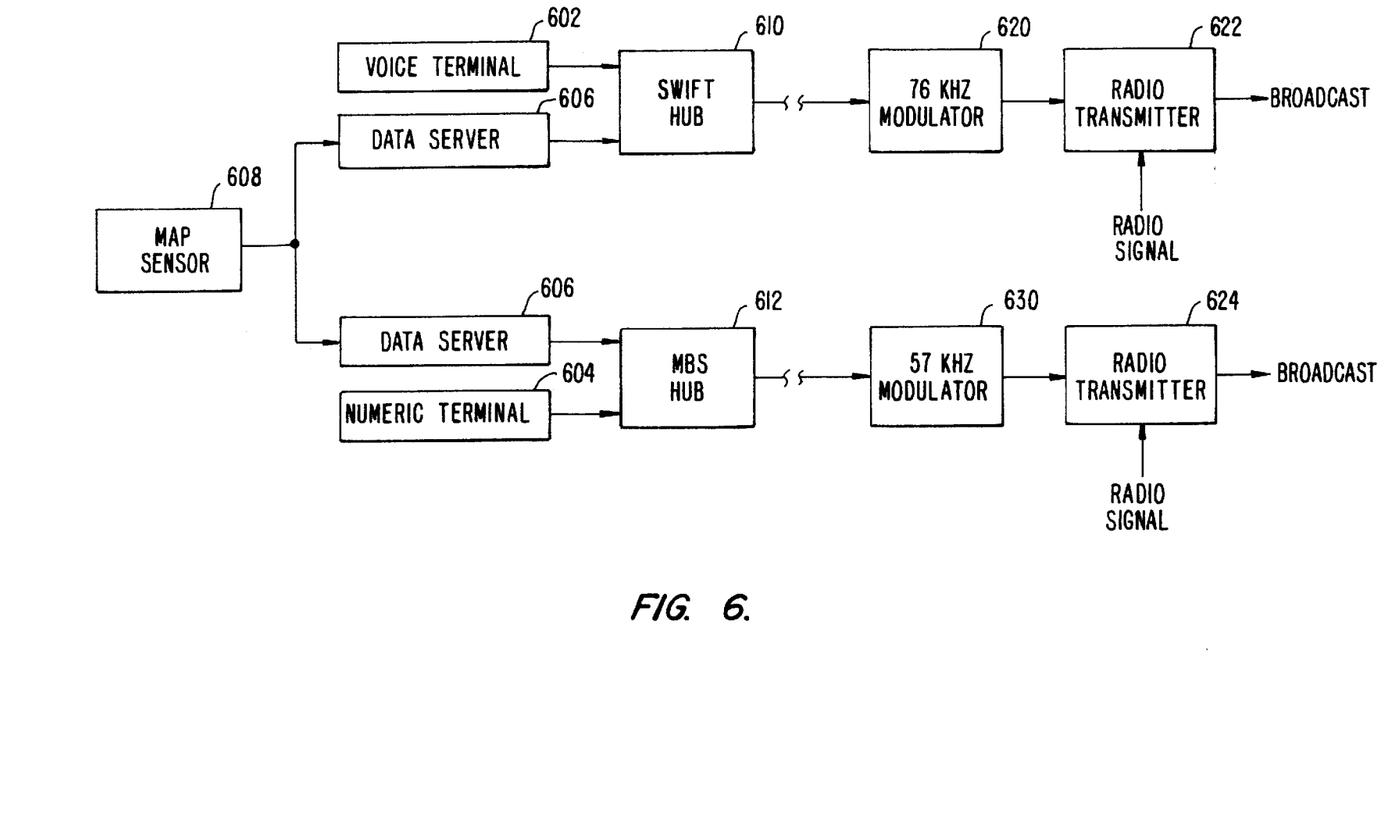
FIG. 6 is a block diagram of a page server operable over the MBS and SWIFT protocols.

Referring now to FIG. 6, details of a paging server 600 are there shown. The functionality of paging server 600 is similar to that of terminal 102 shown in FIG. 1. Paging server 600 is shown comprising a voice terminal 602, a numeric terminal 604, data servers 606, a map server 608, a SWIFT hub 610 and an MBS hub 612. Voice terminal 602, which will tend to require more data per page than pages originating from numerical terminal 604, is coupled to SWIFT hub 610 which, as explained above, has a higher bit rate than MBS hub 612. Consequently, numeric pages originating from numeric terminal 604 are provided to MBS hub 612. Map server 608 provides map, navigation and location data to data servers 606. One data server provides the map data to SWIFT hub 610, while another data server 606 provide similar map data to MBS hub 612. Of course, given the relative capacities of hubs 610 and 612, the data server coupled MBS hub 612 may transmit less map data than the data server coupled to SWIFT hub 610.

The data output from SWIFT hub 610 is modulated by a modulator 620 to form a 76 kHz subcarrier signal, which is combined with a radio station's radio signal at a radio transmitter 622 for broadcast. The output of SWIFT hub 610 can be provided to modulator 620 in a number of different ways, which are not relevant here and are therefore omitted.

Likewise, the data output from MBS hub 612 is provided to a modulator 630 which modulates a 57 kHz subcarrier, which is in turn combined with the radio station's radio signal using radio transmitter 624, and then broadcast. As should be apparent from this description, a single radio station, and therefore a single radio transmitter, might be used to carry both the SWIFT subcarrier and the MBS subcarrier.

Figure 7:
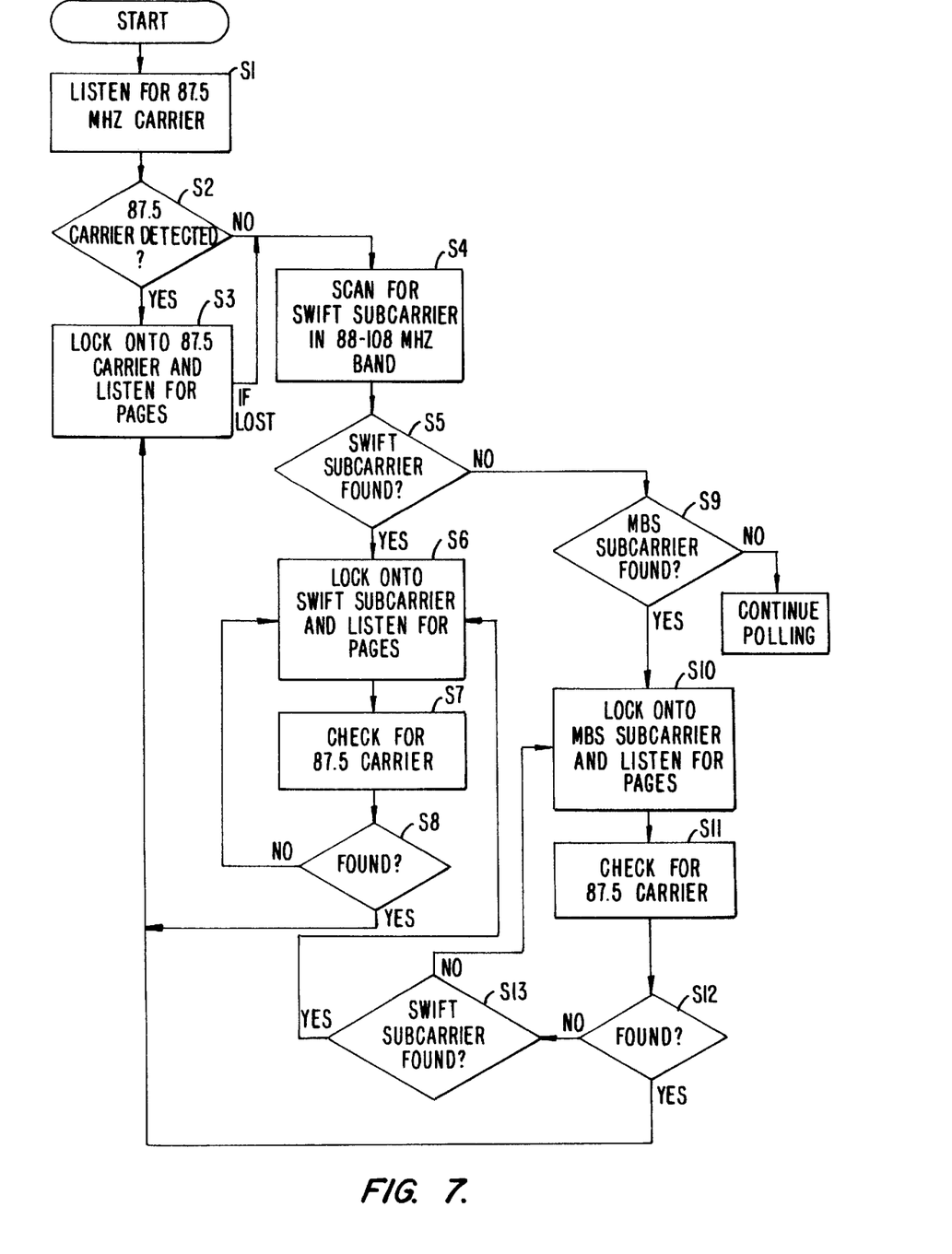
FIG. 7 is a flow chart of a process for seeking an optimal reception mode in a pager.

FIG. 7 is a flow chart of a process followed by a pager such as pager 110 (shown in FIG. 1) in selecting a channel over which to receive pages. The blocks on the flow chart are numbered S1 and S2, etc., which is the order of the execution of the steps except where otherwise noted.

At step S1, the pager listens for a FM carrier at 87.5 MHz. It should be understood that, while 87.5 MHz is a preferred frequency because it is just outside the normal FM broadcast band, other frequencies can be used, especially where the pager is used in a region of the world having a normal FM broadcast band other than the range of 88 to 108 MHz. In any case, if the carrier is detected at step S2, the pager locks on to the carrier (S3) and listens for pages.

If the carrier is not detected at step S2, or the carrier is lost at step S3, the pager scans for a SWIFT subcarrier in the normal FM band (S4). As should be apparent, this process does not depend on the details of the SWIFT protocol except to the extent that the subcarrier sought at step S4 is of a higher bit rate or otherwise preferred relative to a subcarrier signal which is used if the preferred subcarrier is not found. If, at step S5, the SWIFT subcarrier is found, the pager locks on to the SWIFT subcarrier and listens for pages (S6). Periodically, the pager will check for the 87.5 MHz carrier (S7), and if found (S8), the pager will proceed back to step S3 of the process and lock on to that carrier. However, if the carrier is not found at step S8, the process continues with step S6 and the pager continues to listen for pages on the SWIFT subcarrier.

If, at step S5, the SWIFT subcarrier is not found, the process proceeds to step S9, where the pager looks for an MBS subcarrier. If an MBS subcarrier is not found, the pager will go into a sleep mode, continue polling or alert the subscriber to the lack of signal. In North America, subscribers to the CUE network will generally be able to lock on to at least an MBS subcarrier, as the CUE network covers nearly all of North America using over 520 FM radio stations. The CUE network, operated by as many of the present applications, also provides coverage of the top Metropolitan radio markets with SWIFT protocol pages, covering 95% of the population of North America.

If an MBS subcarrier is found at step S9, the pager locks onto the MBS subcarrier and listens for pages (S10). Periodically, the pager will check for the 87.5 MHz subcarrier (S11) from a transceiver such as transceiver 130 shown in FIGS. 1 and 3. If that carrier is found at step S12, the pager proceeds back to step S3, locking on to the 87.5 MHz carrier and listening for pages. If, on the other hand, the 87.5 MHz carrier is not found at step S12, the pager looks for a SWIFT subcarrier (S13). If the SWIFT subcarrier is found, the pager proceeds back to step S6 and locks onto the SWIFT subcarrier. If the SWIFT subcarrier is not found at step S13, the pager continues at step S10 to listen for pages on the MBS subcarrier.

Figure 8:
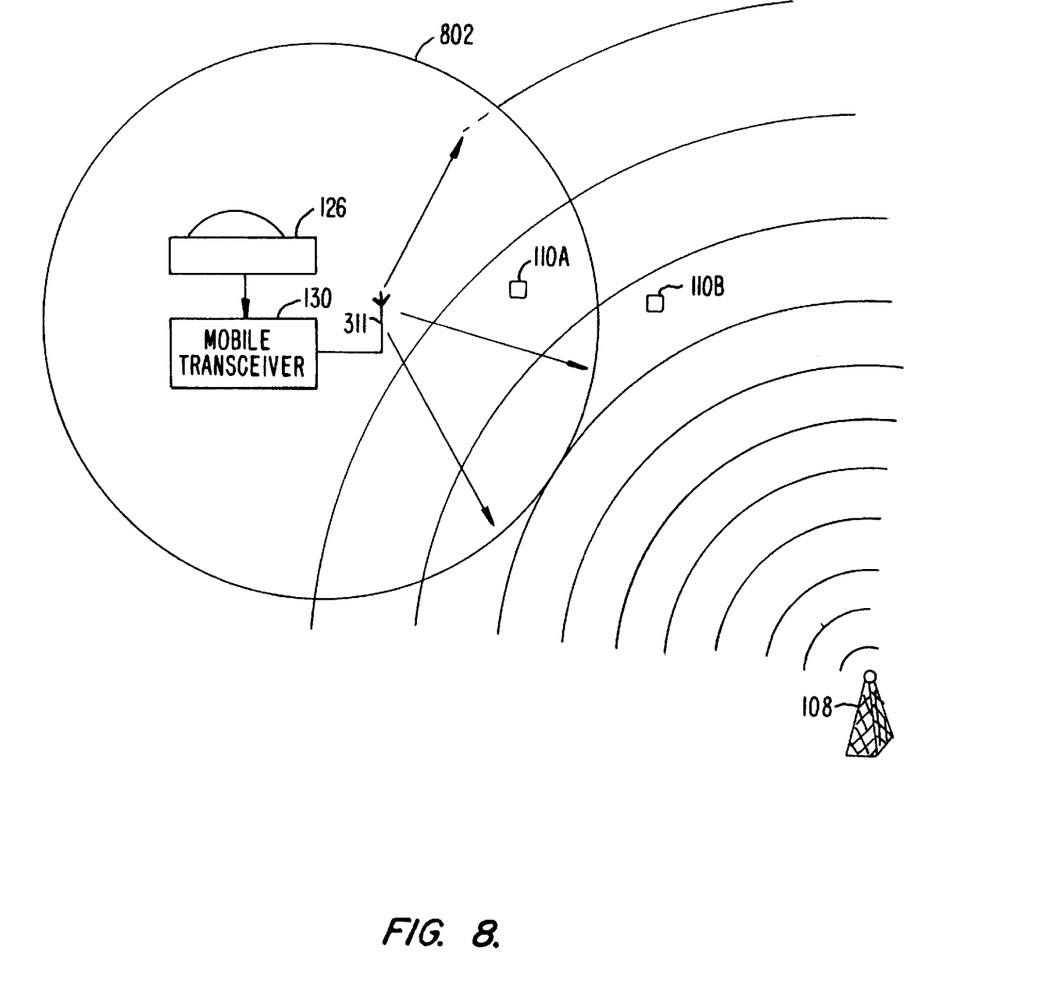
FIG. 8 is an illustration of pagers in use inside a mobile transceiver range and outside the mobile transceiver range.

Referring now to FIG. 8, an illustration of a pager switching between a transceiver signal and a broadcast signal is there shown. As transceiver 130 rebroadcasts the satellite signal received using wide band antenna 126 at low power, the signal transmitted from antenna 311 has a limited range denoted by area 802. Pager 110A, being within area 802 detects and receives a paging signal from 311 and therefore receives its pages through transceiver 130. On the other hand, pager 110B, which is outside of area 802, does not receive signals from antenna 311 and therefore relies on pages sent over the FM broadcast band from antenna 108.

Satellite Transceiver Reception:

Satellite transceivers 130 take the paging data delivered over the L-band satellite and retransmits it low powered in a vehicle on a fixed frequency 87.5 MHz. The signal outside of the FM band (88 to 108) is chosen to prevent the low power unregulated signal from being swamped by licensed broadcasters in the area.

The FM subcarrier receiver is a dual subcarrier receiver. It looks primarily to the 76 kHz subcarrier which it decodes high speed (8000 bps) data in what is known as the SWIFT format. If there is not a 76 kHz signal, the FM receiver automatically looks for a signal on the 57 kHz subcarrier where data would be broadcasted using MBS or RDS formats. While the receiver is a scanning receiver, it does not scan when relying upon the satellite transceiver reception but is programmed to receive data just outside the regular FM band at 87.5 MHz.

Licensed Broadcast Transmission:

The same data sent over an L-band satellite system for the satellite transceiver in the vehicle is sent over a C-band satellite system to receive it directly at licensed broadcast FM stations through North America. There the data is transmitted on the FM subcarrier that has been leased from the broadcaster. Data may be sent over both the 57 kHz subcarrier and the 76 kHz subcarrier at the higher data rates.

Again, the FM receiver or pager is a dual subcarrier receiver that will first look for data on the 76 kHz subcarrier, and if it finds one, will immediately switch to the 57 kHz subcarrier.

A preferred embodiment of the system relies on two FM broadcast systems, one called RDS or MIS, which is on the 57 kHz subcarrier, and the second a high speed system which is in more limited markets on the 76 kHz subcarrier using a data format referred to as SWIFT.

In the case of reception directly from the FM broadcaster, the pager goes into the full scan mode and would not receive data at 87.5 but rather on the frequency of the station in the broadcast area. The pager scans the regular FM band from 88 to 108 and will lock onto a station having the network address of the particular network operator employing the system, which in the case at hand, is the CUE network.

The systems described above offer much greater coverage than existing paging systems for at least two reasons. First, in the case of data transmitted over licensed broadcasters, two different networks are used because the receiver is a dual subcarrier receiver capable of receiving data on both the 57 kHz and the 76 kHz subcarrier networks.

A second reason why coverage is greater is that the message data may be received both over licensed broadcast FM stations as well as directly from an L-band satellite system. In the case of the latter system, the data is rebroadcast in a low powered unregulated fashion to the same dual subcarrier receiver using a protocol that allows the receiver in that mode to receive data just outside the regular FM band at 87.5 MHz.

Data Applications:

Data being transmitted over the system, whether it's a satellite transceiver system or the regular licensed FM band system, is not limited to paging messages but may include also information services such as Differential GPS and traffic information and other forms of data.

To accommodate data, the receiver has both a PIN and cap code for personal messaging and a series of possible service addresses (SA) for datacasting services where the data is transmitted to all receivers receiving that specific service. In the case of the data applications, the system also broadcasts a security code (SC) that activates an algorithm changing the service addresses as a function for translation of the PIN to prevent the possibility of the receivers being cloned and to mitigate effective service. The over-the-air security code or service algorithm capability is an alternate preferred embodiment.

This specific service is used in the preferred embodiment on numeric paging, alphanumeric paging, Differential GPS data, traffic alerts, and emergency alerts.

The satellite transceiver version of the service also has a may-day feature. If an emergency is encountered in the vehicle, activating a button on the transceiver automatically sends back a location signal to Network Control. Network Control has the capability to respond back to the vehicle indicating that the emergency has been addressed and the particular assistance is being provided. This is conveyed by an alphanumeric page.

The may-day service is made possible by the fact that the antenna used to receive the L-band paging transmission can also receive position reports from the 27 NavStar GPS satellites. Accordingly, the antenna being used in the system in the vehicle is capable of receiving data from two different satellite systems (L-band and GPS), as well as retransmitting data on the L-band system.

The above description is illustrative and not restrictive. Many variations of the invention will become apparent to those of skill in the art upon review of this disclosure. Merely by way of example, transceiver 130 is described as being a mobile transceiver usually mounter in a vehicle. However, a semi-mobile transceiver could be installed in a building such that all the pagers in the vicinity of the building can receive pages from the semi-mobile transceiver. The scope of the invention should, therefore, be determined not with reference to the above description, but instead should be determined with reference to the appended claims along with their full scope of equivalents.

What is claimed is:

1. A paging network for distributing page messages, comprising:
    a page server;
    a satellite uplink coupled to receive pages from the page server;
    a ground-based satellite transceiver adapted to receive pages broadcast from a satellite that is retransmitting the pages received from the satellite uplink;
    a transmitter, within the satellite transceiver for retransmitting at least some of the pages at low power in a local area; and
    a pager for receiving the pages transmitted by the transmitter when the pager is in the local area.

2. The paging network of claim 1, wherein the pager further comprises circuitry to receive pages from FM broadcast stations when the pager is outside the local area of the transmitter.

3. The paging network of claim 1, wherein the pager is assigned to a subscriber and is one of a plurality of pagers each assigned to a subscriber.

4. The paging network of claim 1, wherein the satellite transceiver includes a filter for filtering received pages to selectively retransmit pages addressed to a pager associated with that satellite transceiver.

5. The paging network of claim 1, wherein the satellite transceiver includes an uplink transmitter for transmitting messages to the satellite.

6. The paging network of claim 1, wherein a page comprises at least one of a numeric page, a voice page, an alphanumeric page: a data block page, and a navigation page.

7. The paging network of claim 1, wherein the pager includes a receiver for receiving signals in an FM broadcast band and outside the FM broadcast band.

8. The paging network of claim 1, wherein the satellite transceiver comprises circuitry to transmit outside the FM band and the pager comprises circuitry to scan the FM band when a signal from the satellite transceiver is not received.

9. The paging network of claim 1, wherein the pager includes a scanner for scanning the FM broadcast band when outside the local area and a tuner for selecting a high bandwidth channel when the high bandwidth channel is defected and for selecting a low bandwidth channel otherwise.

10. A pager for receiving broadcasted pages, comprising:

a first detector for detecting a presence of a high capacity transmission;

a second detector for detecting a presence of a low capacity transmission, wherein said low capacity transmission comprises data transmitted at a lower bit rate than in said high capacity transmission; and switching means for switching to the high capacity transmission when the first detector detects the high capacity transmission and for switching to the low capacity transmission when the first detector does not detect the high capacity transmission and the second detector detects the low capacity transmission.

11. The pager of claim 10, wherein the high capacity transmission is transmitted over one subcarrier of an FM broadcast signal and the low capacity transmission is transmitted over a second subcarrier of the FM broadcast signal.

* * * * *